United States Patent

[11] 3,612,306

| [72] | Inventor | Eivind M. Rambo |
| | | Maple Plain, Minn. |
| [21] | Appl. No. | 19,735 |
| [22] | Filed | Mar. 16, 1970 |
| [45] | Patented | Oct. 12, 1971 |
| [73] | Assignee | Van Dusen & Co., Inc. |
| | | Wayzata, Minn. |

[54] TAPERED SIDE SHIELD FOR SILO UNLOADER
3 Claims, 4 Drawing Figs.

| [52] | U.S. Cl. | 214/17 DB |
| [51] | Int. Cl. | B65g 65/38 |
| [50] | Field of Search | 214/17 DB; 302/56 |

[56] References Cited
UNITED STATES PATENTS

| 2,794,560 | 6/1957 | Buschbom | 214/17 DB |
| 3,227,293 | 1/1966 | Poutsch | 214/17 DB |

*Primary Examiner*—Robert G. Sheridan
*Attorney*—Dugger, Peterson, Johnson & Westman ABSTRACT: A direct throw silo unloader having two feed augers, and utilizing a tapered shield on one auger of the feed in system so that both sides of the direct throw impeller are fed evenly, in order to increase throw discharge volume of the direct throw silo unloader.

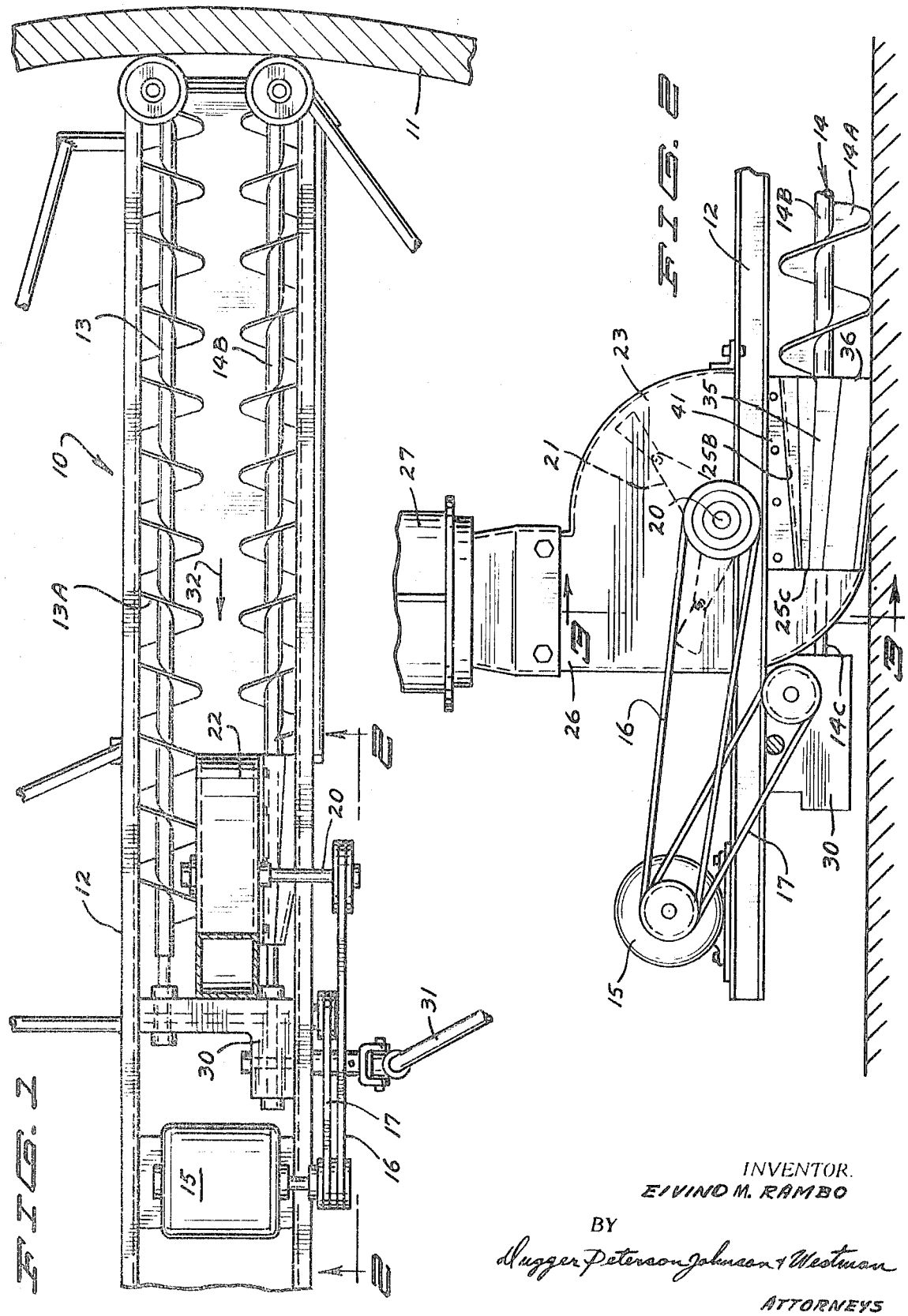

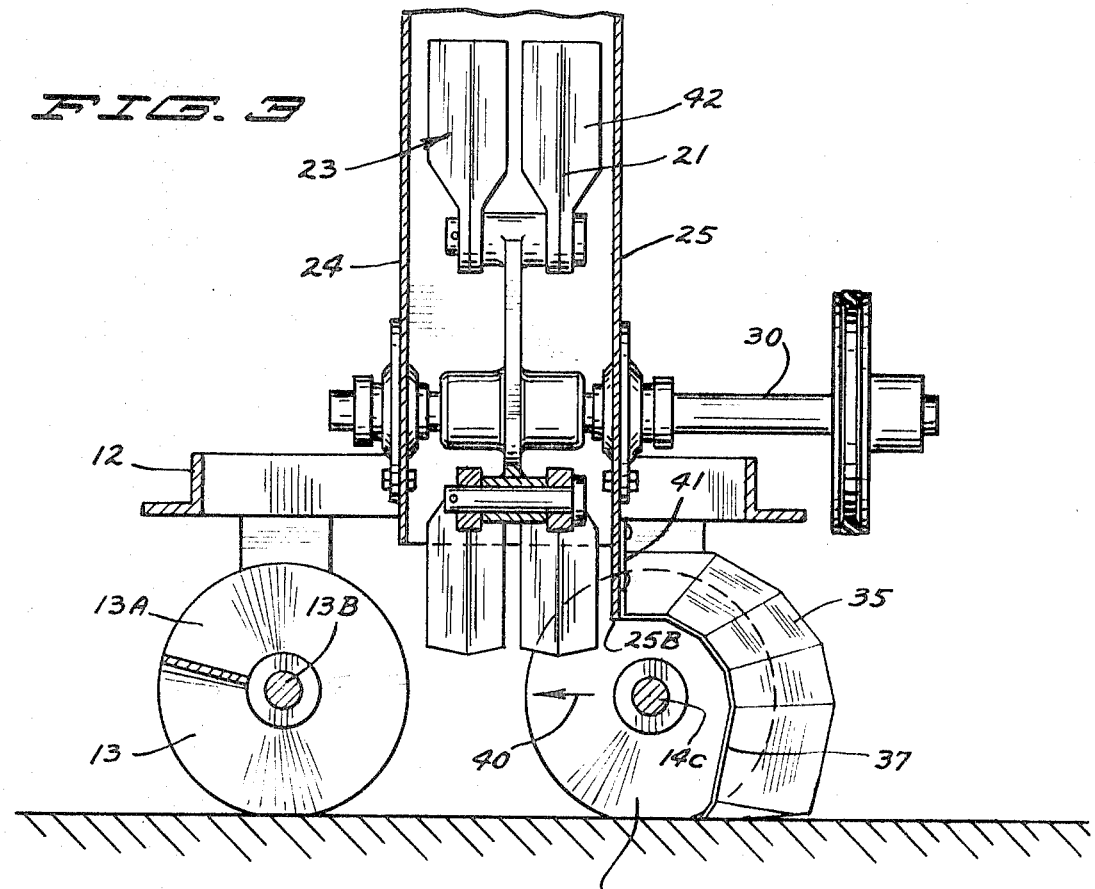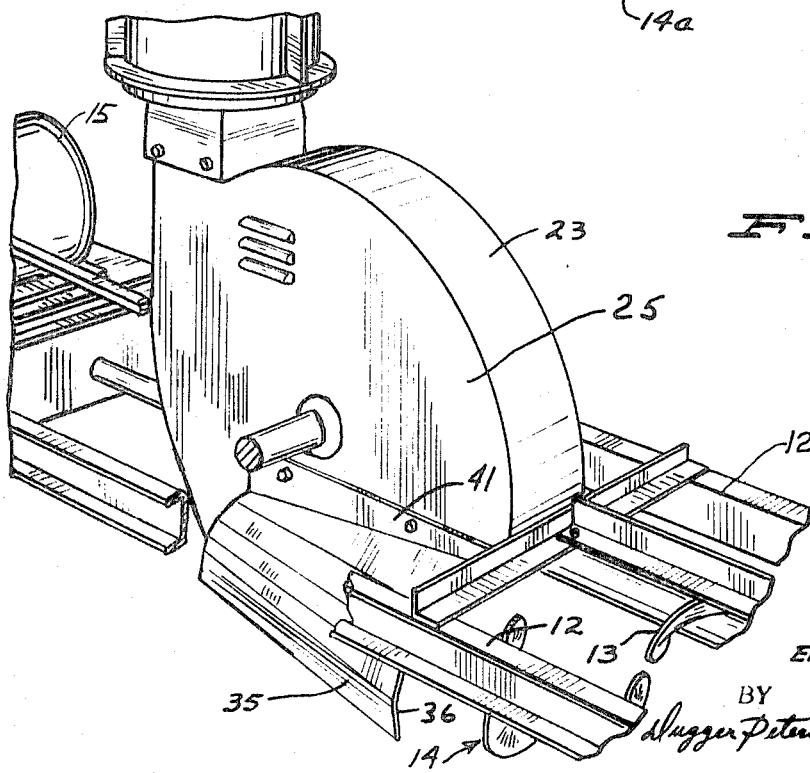

TAPERED SIDE SHIELD FOR SILO UNLOADER

BACKGROUND OF THE INVENTION

1. Field of the Invention

The present invention relates to improvements in direct throw silo unloaders, and more particularly to feeding mechanism for such unloaders.

2. Prior Art

In direct throw silo unloaders, such as that shown in U.S. Pat. No. 2,794,560, the feeding of material is generally done with a pair of augers, one of which feeds along one side of the direct throw impeller or rotor and the other of which terminates adjacent the other side, but ahead of the impeller. In the usual direct throw silo unloader, such as that shown in the aforesaid U.S. patent, the sidewall of the impeller housing the side of the short auger extends downwardly and terminates just above the plane defined by the bottoms of the twin augers. This has been found to cause problems in feeding because the bottom edge of that sidewall of the impeller housing will hang up on silage so that the unloader will not feed evenly. The feed will stop and someone will have to get in to dislodge the compacted silage from underneath the side wall of the impeller housing. The impeller does not operate at full efficiency because it takes most of the silage load on the one side using the long auger.

SUMMARY OF THE INVENTION

The present invention relates to an improvement in feed means for the rotary impeller of a direct throw silo unloader. At least one auger is terminated ahead of the impeller or rotor housing as before, but the sidewall of the housing adjacent that auger is cut away so that the sidewall extends only down to adjacent the top of the auger flight, and a tapered feed chute of reducing cross-sectional area in direction of movement of the material is placed alongside the impeller housing to receive material being fed by the auger and guide the material alongside the impeller housing in a gradually reducing feed flow to evenly feed the material toward the side of the impeller or rotor. This insures that the unit will continue to feed evenly and make maximum utilization out of the impeller. The tapered feed chute provided is simple to make, easy to manufacture, and can be installed as a field repair item in order to increase the capacity of existing silo unloaders.

BRIEF DESCRIPTION OF THE DRAWINGS

FIG. 1 is a fragmentary top plan view of a typical direct throw silo unloader having a feed means made according to the present invention;

FIG. 2 is a side elevational view of the impeller portion of the device of FIG. 1 and taken as on line 2—2 in FIG. 1;

FIG. 3 is a sectional view taken as on line 3—3 in FIG. 2; and

FIG. 4 is a fragmentary perspective view of the feed device of the present invention.

DESCRIPTION OF THE PREFERRED EMBODIMENT

In FIG. 1, there is shown a silo unloader of the direct throw type illustrated generally at 10. A silo wall 11 is shown fragmentarily. The unloader is used for removing silage from the silo. The silo unloader includes a frame 12 that mounts a pair of substantially parallel feed auger assemblies 13 and 14, respectively The feed auger assemblies are mounted to drive means at the inner end, and rotatably mounted at the outer end. The frame mounts a drive motor 15 driving belts 16 and 17. The belt 16 is used for driving a shaft 20 that in turn drives the rotor illustrated generally at 21 of a direct throw, material thrower assembly 22. The thrower assembly is a conventionally used centrifugal-type thrower. The thrower assembly has an outer housing 23 comprising a pair of sidewalls 24 and 25 joined together with an end wall, and curved so that the unit has an outlet neck 26 through which material will be discharged when the rotor is driven. A discharge chute 27 can be provided, and is connected through a swivel coupling because the silo unloader will turn in the silo as it unloads.

The motor 15 also drives a gear drive mechanism illustrated generally at 30 through the belt 17, and this gear drive mechanism drives the auger assemblies 13 and 14, as well as driving a power drive shaft 31, for rotationally driving the unloader around the silo as it unloads in a known manner. The auger assemblies 13 and 14, as stated previously, each have helical outer flights, 13A and 14A as shown, and have inner tubes on which the flights are mounted. The tubes also have outwardly extending end shafts attached thereto. The end shafts are mounted in bearings at the outer ends and the inner end shafts are drivably mounted to the gear drive 30.

The auger assembly 13 extends laterally past the side panel or wall 24 of the impeller assembly 20, as shown perhaps best in FIG. 4. The helical flights, as shown in FIG. 1, go all the way past the rotor so that the helical flights extend all the way down along that side of the rotor for the thrower.

It should be noted that the feeding direction for the silage is indicated by the arrow 32, in toward the impeller.

On the side of the impeller to which auger 14 feeds, the helical flights 14A and the center pipe 14B terminate ahead of the forward portion of the impeller, as shown in FIGS. 1 and 2. The end shaft 14C continues on past the side wall 25 of the impeller and is mounted in the gear drive 30.

The termination of the helical flights 14A at the front wall is desirable in order to prevent feeding large chunks and other obstacles into the impeller, and in previous silo unloaders, the wall 25 adjacent the auger 14 has been extended downwardly so that it was substantially at the same level as the bottom of the flights as viewed in FIG. 3. However, in the present invention, the sidewall 25 is terminated above the center of the axis of the shaft 14C as shown along edge 25B in FIG. 3. This wall termination comprises a cutout in the sidewall 25 extending laterally rearwardly or in the direction as indicated by the arrow 32 that also terminates along a line as shown in FIG. 2 at 25C. The cutaway leaves an open portion along the side of the impeller forming a feed opening. The helical flights 14A however, terminate short of this wall 25, and in order to insure a relatively smooth flow and even feeding of material from the auger 14 into the impeller, the improvement comprises the addition of a tapered feed chute 35 over the side opening in wall 25 that is defined by the edges 25B and 25C.

The tapered feed chute 35, as shown, extends outwardly so that the outer end 36 overlaps the inner end of the helical flights 14A of the auger 14 and is larger than the auger so that material being fed by the auger 14 will be moved inside the periphery of the tapered feed chute 35 and will flow and will be pushed along this feed chute in toward the impeller 21. The opening underneath edge 25B will permit material to be fed laterally in to the impeller. The chute 35 is open at its outer end along the edge 37, but this opening when viewed in end view as in FIG. 3 is substantially smaller in relation to a plane defined by the wall 25 than the end 36. The smaller end 37 thus provides a feed restriction so that silage or material flowing through this tapered feed chute 25 will tend to be moved inwardly toward the impeller in direction as indicated by arrow 40 in FIG. 3. The arrow 40 shows the feeding inwardly of the silage. As can be seen, the feed chute 35 includes a flange 41 that is attached to the wall 25 and holds the feed chute in position, and other than this is merely a partial wall that reduces in cross-sectional size, or in opening size from the outer portions of the auger flights 14A inwardly toward the impeller, and in direction of normal feed movement of the auger. The chute 35 could be frustoconical, or can be made with a series of bends as shown in FIG. 3.

By feeding the material in gradually along the lateral side wall 25 of the impeller housing, the capacity of the impeller is greatly increased because all of the impeller paddles illustrated at 42 will be working to full efficiency, and the horsepower consumed does not increase in any significant amount. The horsepower requirements are somewhat increased but not in proportion to the increase in feeding. The reason for this, is that previously the inefficient feeding where the auger 14 stopped short of the front wall, wasted horsepower because the full width of the impeller paddles was not adequately used. Most of the feeding took place along the long auger assembly 13. However, as stated previously, the use of two long augers is not satisfactory because of the likelihood of completely plugging the impeller through the introduction of large slugs of silage, particularly frozen chunks. With the short auger 14, the silage is sheared off and broken up as it is fed, but with the use of the open sidewall 25 and the tapered feeding chute, the feed is kept even, and the capacity of the impeller is thus increased.

The cutaway of the wall 25 also prevents the wall from becoming hung up on silage and insures that the unit will feed downwardly in a smooth manner.

What is claimed is:

1. In a silo unloader having elongated auger-type feed means moving material in a given direction, and a rotary impeller for throwing material adjacent the end of said elongated feed means, said elongated feed means comprising at least one auger having helical flights terminating short of the impeller path, and rotatable about an axis to one side of the impeller path, the improvement comprising a housing for the impeller having a sidewall defining a lateral facing opening on the side adjacent the axis of rotation of said auger, and a tapered feed chute overlapping said opening in said sidewall, said tapered feed chute having an outer end overlapping the end portion of said auger, and tapering in direction of normal movement of material fed by the auger to a cross-sectional size substantially smaller than the outer end, said tapered feed chute tapering toward the plane of said sidewall.

2. The combination as specified in claim 1 wherein said elongated feed means comprises a pair of substantially parallel augers, a first auger having the tapered feed chute thereover, and a second auger along the opposite side of said rotary impeller and having helical flights that extend laterally adjacent the path of said impeller.

3. The silo unloader of claim 1 wherein the tapered feed chute includes means to fasten the feed chute to said sidewall above the opening defined in said sidewall.